(No Model.)

H. X. ZIMMERMAN.
CAR WHEEL.

No. 512,855. Patented Jan. 16, 1894.

WITNESSES:
F. L. Ourand
J. L. Coombs

INVENTOR:
Henry X. Zimmerman
by Louis Bagger & Co.
Attorneys.

UNITED STATES PATENT OFFICE.

HENRY XENOCLES ZIMMERMAN, OF LA SALLE, ILLINOIS.

CAR-WHEEL.

SPECIFICATION forming part of Letters Patent No. 512,855, dated January 16, 1894.

Application filed April 17, 1893. Serial No. 470,708. (No model.)

*To all whom it may concern:*

Be it known that I, HENRY XENOCLES ZIMMERMAN, a citizen of the United States, and a resident of La Salle, in the county of La Salle and State of Illinois, have invented certain new and useful Improvements in Car-Wheels; and I do hereby declare that the following is a full, clear, and exact description of the invention, which will enable others skilled in the art to which it appertains to make and use the same, reference being had to the accompanying drawings, which form a part of this specification.

My invention relates to improvements in wheels for railway cars and coaches, and while adapted for use with any kind of car is more especially applicable to electric cars, whether operated by storage battery or an overhead or underground system.

The object of the invention is to provide a novel wheel of the above character which shall possess superior advantages with respect to efficiency in use.

The invention consists in the novel construction of wheel hereinafter fully described and claimed.

Figure 1:
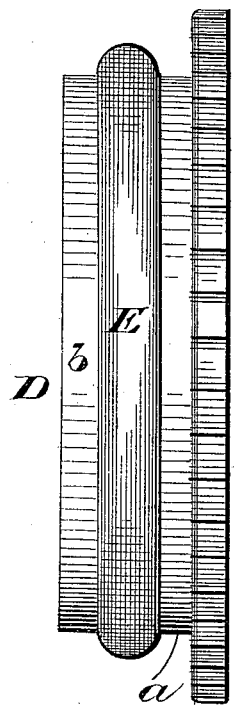
Figure 2:
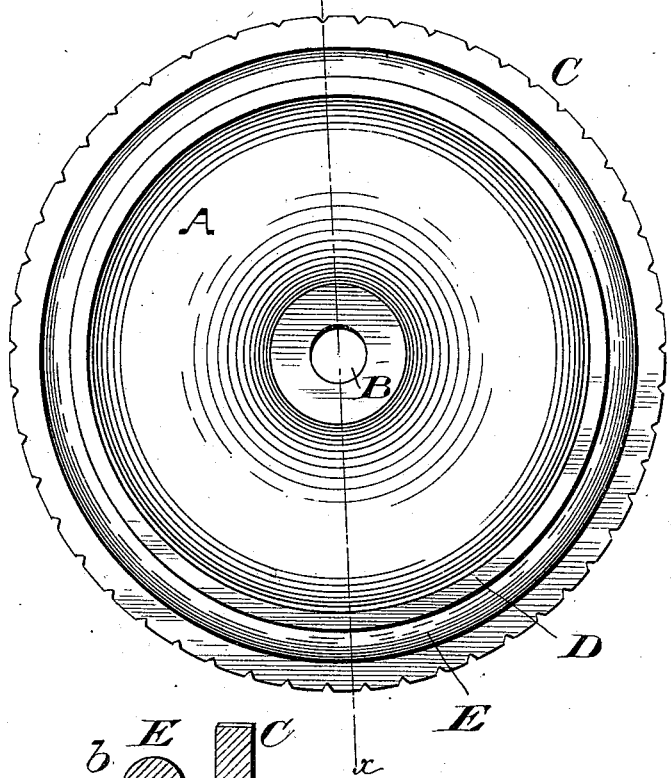
Figure 3:
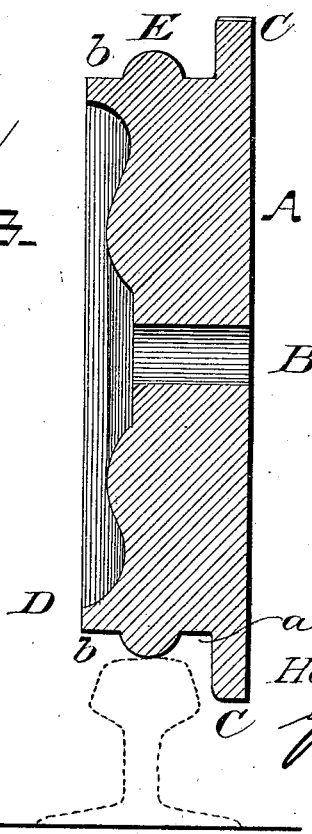

In the accompanying drawings: Figure 1 is a side elevation of a car wheel constructed in accordance with my invention. Fig. 2 is a face view of the same from the outside, looking toward the flange. Fig. 3 is a cross section through the center of the wheel and rail on line $x-x$, Fig. 2.

Like letters of reference denote corresponding parts in all the figures.

My improved wheel which may be constructed of iron, steel or other suitable material, consists of the central circular web or body A, having a hole B, in the center for the insertion of the axle (not shown), in the usual manner. The wheel flange is shown at C and the "tread" of the wheel at D. Upon the tread or periphery D is a secondary flange E, which is in the nature of a bead or rim, preferably semicircular in cross section, leaving a narrow space $a$, between it and the flange and another corresponding narrow space $b$, between it and the outer face of the wheel. This bead or flange E may be cast integral with the wheel, or it may be made separate therefrom and shrunk thereon, in substantially the same manner as shrinking a metal tire upon a wooden wheel, or it may be fastened to the wheel by bolts or rivets or fastened thereto in any other manner found convenient. While this bead is preferably made semi-circular it may be of any other shape desired.

For the purpose of assisting in dislodging ice from the track, the outer side and edge of the flange C, may be ridged or corrugated as seen in Fig. 1. This, however, is not essential or necessary for the proper working of the wheel, and may be dispensed with if desired.

In operation, while the wheel runs upon the rail, the secondary flange or bead E, will run on the tread or flat top R, of the rail, as clearly shown in Fig. 3, the wheel being kept in place on the rail, as usual, by the inside flange C. The advantage of this is not only a great saving in the wear of the wheel, but the latter will get a better "grip" on the rail, than otherwise, so as to exercise a much greater pulling or traction power than a wheel with the customary smooth and even tread. In electric cars where the return current is sent from the motor through the wheel axle, wheel and rails, this wheel offers peculiar advantages in this, that it will always maintain connection and contact with the rail, which acts as a conductor. When the rail is covered (as often happens) with a layer of dust and dirt, or snow and ice, the circuit is liable to be broken between the wheels and the rail, where a wheel of ordinary construction is used; but with my improved wheel, the flange or circumferential bead E, will cut through any deposit on the tread of the rail, so as to establish and maintain metallic connection between the periphery of the wheel and rail, thus keeping the circuit unbroken at all times.

By forming the outer face or side of the flange C and its edge, with ridges or corrugations, the breaking up and dislodging ice from the side of the rail is facilitated.

Having thus described my invention, what I claim is—

1. A car wheel consisting of the web, the inner annular flange, and the peripheral bead or rim intermediate of said flange and the outer face of the wheel, forming spaces between said bead and the faces of the wheel, substantially as described.

2. A car wheel consisting of the web, the inner annular flange having its outer face and edge formed with ridges or corrugations, and the peripheral bead intermediate of said flange and the outer face of the wheel; substantially as described.

In testimony that I claim the foregoing as my own I have hereunto affixed my signature in presence of two witnesses.

HENRY XENOCLES ZIMMERMAN.

Witnesses:
 WILLIAM F. McNAMARA,
 WALTER PARMECK.